United States Patent [19]

Tsujimoto et al.

[11] Patent Number: 5,400,130
[45] Date of Patent: Mar. 21, 1995

[54] LIGHT WAVE DISTANCE MEASURING APPARATUS

[75] Inventors: Koki Tsujimoto; Shigeru Aoki, both of Yokohama, Japan

[73] Assignee: Nikon Corporation, Tokyo, Japan

[21] Appl. No.: 63,314

[22] Filed: May 19, 1993

[30] Foreign Application Priority Data

May 26, 1992 [JP] Japan ............................ 4-041438 U

[51] Int. Cl.[6] .......................... G01C 3/08; G01S 13/08
[52] U.S. Cl. .................................... 356/5.01; 342/127
[58] Field of Search ............................ 356/5; 342/127

[56] References Cited

U.S. PATENT DOCUMENTS

| | | | |
|---|---|---|---|
| 4,146,328 | 3/1979 | Hullein et al. | 356/5 |
| 4,453,825 | 6/1984 | Buck et al. | 356/5 |
| 5,082,364 | 1/1992 | Russell | 356/5 |
| 5,162,862 | 11/1992 | Bartram et al. | 356/5 |
| 5,210,587 | 5/1993 | Ohmamyuda et al. | 356/5 |

*Primary Examiner*—Stephen C. Buczinski
*Attorney, Agent, or Firm*—Shapiro and Shapiro

[57] ABSTRACT

A light wave distance measuring apparatus structured such that frequency dividing circuits create a base intermediate frequency outputted to a phase measuring circuit and a PLL reference frequency which is a multiple of an integer a ($a \geq 2$) of the base intermediate frequency, and this PLL reference frequency is outputted to a PLL oscillation circuit, thereby preventing an error in the measurement of distance due to spurious components caused when measuring a phase in the light wave distance measurement.

6 Claims, 4 Drawing Sheets

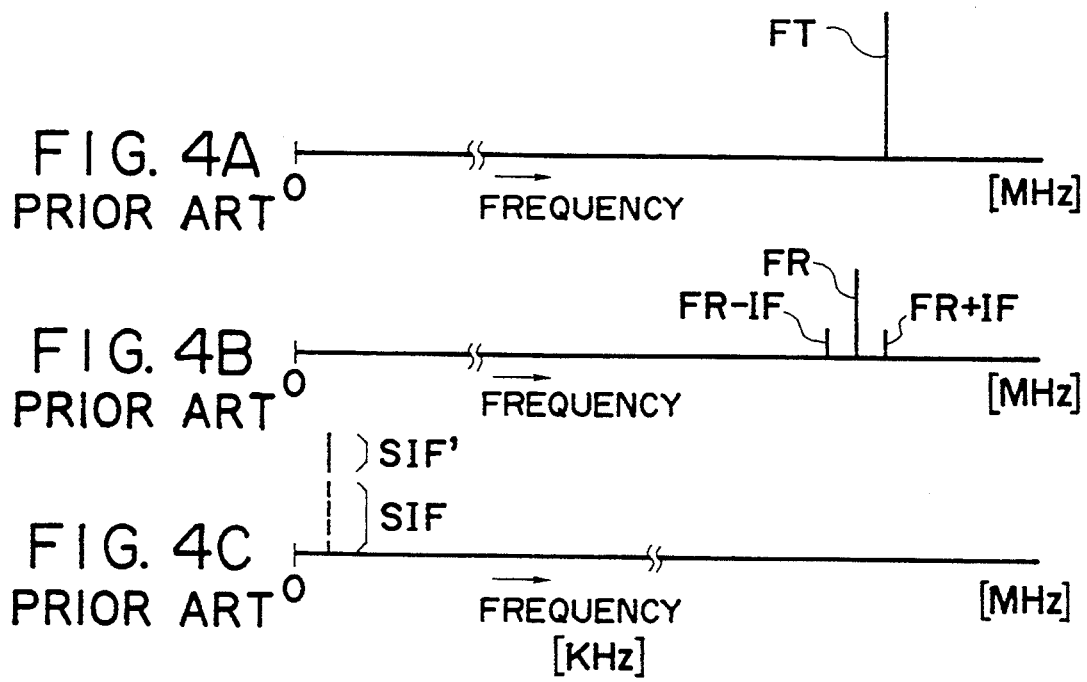

LIGHT WAVE DISTANCE MEASURING APPARATUS

BACKGROUND OF THE INVENTION

1. Field of the Invention

The present invention relates generally to a light wave distance measuring apparatus and, more particularly, to a light wave distance measuring apparatus for measuring a distance by comparing a phase difference between a measuring signal relative to distance measuring light and a reference signal.

2. Related Background Art

FIG. 3 is a block diagram showing one example of construction of a conventional light wave distance measuring apparatus.

An oscillator 101 in the form of a crystal oscillator outputs a clock CLK having a frequency as high as 45.0 [MHz]. A frequency dividing circuit 102 (103, 104) divides the frequency of the clock CLK, thereby creating a modulation signal FT having a relatively high frequency of 15.0 [MHz] and a low reference signal IF having a relatively low frequency of 3.66 [KHz].

A Phase-Locked Loop (PLL) circuit 107 outputs a high reference signal FR having a frequency deviating by the frequency of the low reference signal IF from the frequency of the modulation signal FT, i.e., a relatively high frequency of 14.99633 [MHz] by employing the low reference signal IF as an input signal.

A light emitting element 106 emits the distance measuring light which is intensity-modulated by the modulation signal FT. A light receiving element 112 receives a part of this distance measuring light that is reflected by a known reflector member (unillustrated). The light receiving element 112 outputs a light receiving signal SFT into which the received distance measuring light is photoelectrically converted. A mixer 113 mixes the frequencies of the light receiving signal SFT and the high reference signal FR, thereby creating an intermediate signal SIF. A frequency of this intermediate signal SIF is substantially equal to a frequency of a difference between the frequency of the light receiving signal SFT and the frequency of the high reference signal FR, i.e., the frequency of the low reference signal IF. A band-pass filter (BPF) 114 improves an SN ratio of this intermediate signal SIF. A wave shaping circuit 115 transforms the intermediate signal (analog waveform) passing through the BPF 114 into a predetermined pulse waveform.

A phase measuring circuit 116 compares a phase of the intermediate signal SIF with a phase of the low reference signal IF. The phase measuring circuit 116 outputs a phase difference signal indicating a phase difference between these two compared signals. A microprocessor 117 converts this phase difference signal into a distance to the reflection member in accordance with the frequency of the low reference signal IF employed. The distance is indicated on an indicator 118.

In the case of this light wave distance measuring apparatus, the frequencies of the respective signals are set to satisfy the following conditions:

fFT = b × fIF fFR = (b+1) × fIF, or (b−1) × fIF where fFT is the frequency of the modulation signal FT, fIF is the frequency of the low reference signal IF, fFR is the frequency of the high reference signal FR, and 1/b (b is the integer) is the frequency dividing ratio of the frequency divider.

By the way, this type of the light wave distance measuring apparatus generally includes two internal and external optical paths between the light emitting element and the light receiving element. The internal optical path is conceived as a reference optical path, having a fixed optical path length, along which a beam of light emitted from the light emitting element falls directly on the light receiving element or via the internal optical system. On the other hand, the external optical path is defined as a distance measuring optical path along which the beam of light emitted from the light emitting element outgoes from the apparatus body, subsequently is reflected by the reflection member and incident on the light receiving element.

The light wave distance measuring apparatus described above has such a defect that an error in measurement is induced by fluctuations in phase of the signal due to a built-in electric circuit. Accordingly, for eliminating this error, the prior art light wave distance measuring apparatus is constructed as below.

To be specific, a first optical signal passing through the external optical path and a second optical signal passing through the internal optical path are selectively incident on the light receiving element. First and second light receiving signals photoelectrically converted based on the incident light are thereby obtained. The first and second light receiving signals are converted into first and second intermediate signals having low frequencies. Phases of the first and second intermediate signals are compared with a phase of the reference signal having the low frequency, thus obtaining distances of the internal and external optical paths, respectively. Herein, the distance obtained by use of the second light receiving signal is likely to be a distance of the internal optical path. The distance of the internal optical path is a known value from the design. Hence, if an error is caused between the known distance of the internal optical path and the measured distance of the internal optical path, this error can be conceived as an error due to the electric circuit. Paying attention to this, the error of the electric circuit is obtained, the distance of the external optical path that is obtained from the first light receiving element is compensated by the error of the electric circuit, thereby obtaining a distance to the reflection member.

However, the conventional light wave distance measuring apparatus still, though constructed in the manner described above, contains an error in the distance measured. This error includes an error caused by the PLL circuit.

Next, a PLL circuit 117 will be described in greater detail. A phase comparator 108 makes a comparison between phases of two signals, i.e., a low reference signal IF and another input signal, viz., a feedback signal IF'. The phase comparator 108 outputs a voltage signal (DC voltage) indicating a phase difference between the two signals. A low-pass filter (LPF) 109 smooths the voltage signal and outputs the smoothed voltage signal. A voltage control type oscillation circuit (VCO) 110 outputs a high reference signal FR having a predetermined frequency fFR (high frequency) in proportion to the voltage signal. The frequency of the high reference signal FR is 14.996 [MHz] obtained by subtracting the frequency of the low reference frequency IF from the frequency of the modulation signal FT. A frequency divider 111 divides the frequency of the high reference signal FR. The frequency divider 111 creates a feedback signal IF' having a frequency fIF' substantially equal to the frequency fIF of the input signal IF and outputs this feedback signal to the phase comparator 108.

As explained earlier, the prior art light wave distance measuring apparatus is so set that the signals (actually, the signals having the same frequency) having the low frequency are inputted to the phase measuring circuit and the PLL circuit as well. It is because the input signals having the low frequency are required for facilitating the creation of the high reference signal FR having the frequency fFR deviating by the frequency fIF of the base intermediate signal from the frequency fFT of the modulation signal in the PLL circuit.

However, the PLL circuit 107 is, in principle, easy to undergo a frequency modulation (FM) depending on the frequency of the input signal (low reference signal IF) of the phase comparator 108. Because of this fact, the output signal (high reference signal FR) of the PLL circuit 107 turns out a signal containing the signal FR having the oscillation frequency fFR of the VCO 110 and side band spurious signals FR−IF and FR+IF which deviate by the frequency fIF of the input signal IF from the frequency fFR of the signal FR. Namely, the output signals of the PLL circuit become, as illustrated in FIG. 4B, three signals (1) FR, (2) FR−IF and (3) FR+IF each having a different frequency. These spurious signals cause the error in the measurement. More specifically, the side band spurious signal consisting of (2) FR−IF and (3) FR+IF is mutually modulated with the high reference signal FR when transmitted via a non-linear element such as a mixer 113. Further, the side band spurious signal is frequency-mixed with the light receiving signal SFT. As a result, the side band spurious signal turns out a signal (hereinafter called a low spurious signal) SIF' having a frequency fSIF' (lower frequency) containing no phase information. That is, the mixer 113 mixes the frequencies of the light receiving signal SFT into which the distance measuring light is photoelectrically converted and of the 3-wave component output signals FR, FR+IF and FR−IF containing the spurious signals SIF'. Consequently, as illustrated in FIG. 4C, the low spurious signal SIF' containing no distance information is superposed on the intermediate signal SIF.

According to the conventional light wave distance measuring apparatus, the phase measuring circuit 116 effects a phasic comparison between the frequency of the intermediate signal SIF containing this low spurious signal SIF' and the low frequency fIF of the reference signal IF. This results in such a problem that the phase difference obtained contains an error, and the measured value of distance contains an error.

Then, a variety of contrivances have been performed to lessen those errors in the conventional light wave distance measuring apparatus. For instance, a time constant of the LPF 109 of the PLL circuit is set large to eliminate the spurious components contained in the input signal of the VCO 110. Alternatively, a variable range of the frequency of the output signal of the VCO 110 is narrowed. Variations in the output signal of the VCO 110 are thereby reduced even when the input signal of the VCO 110 changes due to the spurious components.

If the time constant is set large, however, there arises a problem in which stabilization of the PLL circuit is time-consuming when turning ON the power supply and switching over the operation of the PLL circuit. In addition, narrowing the frequency variable range of the output signal of the VCO 110 requires the use of an oscillator exhibiting a high stability wherein the oscillation frequency is hard to change even if variations in the voltage of the power supply are caused due to temperature. The problem is that such an oscillator is too expensive.

Further, for decreasing the mutual modulation in the mixer 113, input levels of the light receiving signal SFT as an input signal to this circuit and of the reference signal FR have to be optimized by a cut-and-try method such as a test. An adjustment thereof is troublesome.

SUMMARY OF THE INVENTION

It is a primary object of the present invention to provide a light wave distance measuring apparatus capable of eliminating an error in measurement due to a side band spurious signal produced in a PLL circuit.

To accomplish this object, the light wave distance measuring apparatus according to this invention includes a means for creating a signal, as an input signal to the PLL circuit, synchronizing with a phase of the a low reference signal and having a frequency that is a-times (a is an integer of 2 or greater) as high as a frequency of the low reference signal IF.

In the light wave distance measuring apparatus according to this invention, the third signal FP having the frequency that is a-times the frequency of the low reference signal IF is inputted to a phase comparator within the PLL circuit, whereby a side band spurious signal is not superposed on an intermediate signal. Accordingly, an error derived from the spurious signal can be eliminated.

To describe it in greater detail, when the third signal FP is inputted to the phase comparator 8 within the PLL circuit, an output signal of a VCO contains the spurious signal. This spurious signal, however, contains a high reference signal FR and spurious signals having frequencies of the high reference signal FR frequency plus or minus the third signal FP frequency. The high reference signal FR and the spurious signal are mixed with a frequency of the light receiving signal. At this time, a frequency mixing means outputs an intermediate signal SIF and a low spurious signal SIF'. The intermediate signal SIF and the low spurious signal SIF have different frequencies. A phase measuring circuit 16 extracts the intermediate signal SIF from output signals of a mixer 13, whereby the spurious signal can be easily eliminated. Thus, the phase can be measured by the intermediate signal SIF containing no spurious signal.

BRIEF DESCRIPTION OF THE DRAWINGS

Other objects and advantages of the present invention will become apparent during the following discussion in conjunction with the accompanying drawings, in which:

FIG. 4A is a diagram showing a frequency component of an output signal of a frequency divider in FIG. 3;

FIG. 4B is a diagram showing a frequency component of an output signal of a PLL circuit in FIG. 3; and FIG. 4C is a diagram showing a frequency component of an output signal of a mixer 113.

DESCRIPTION OF THE PREFERRED EMBODIMENTS

A light wave distance measuring apparatus in accordance with embodiments will be described with reference to FIGS. 1 to 2C.

Figure 1:
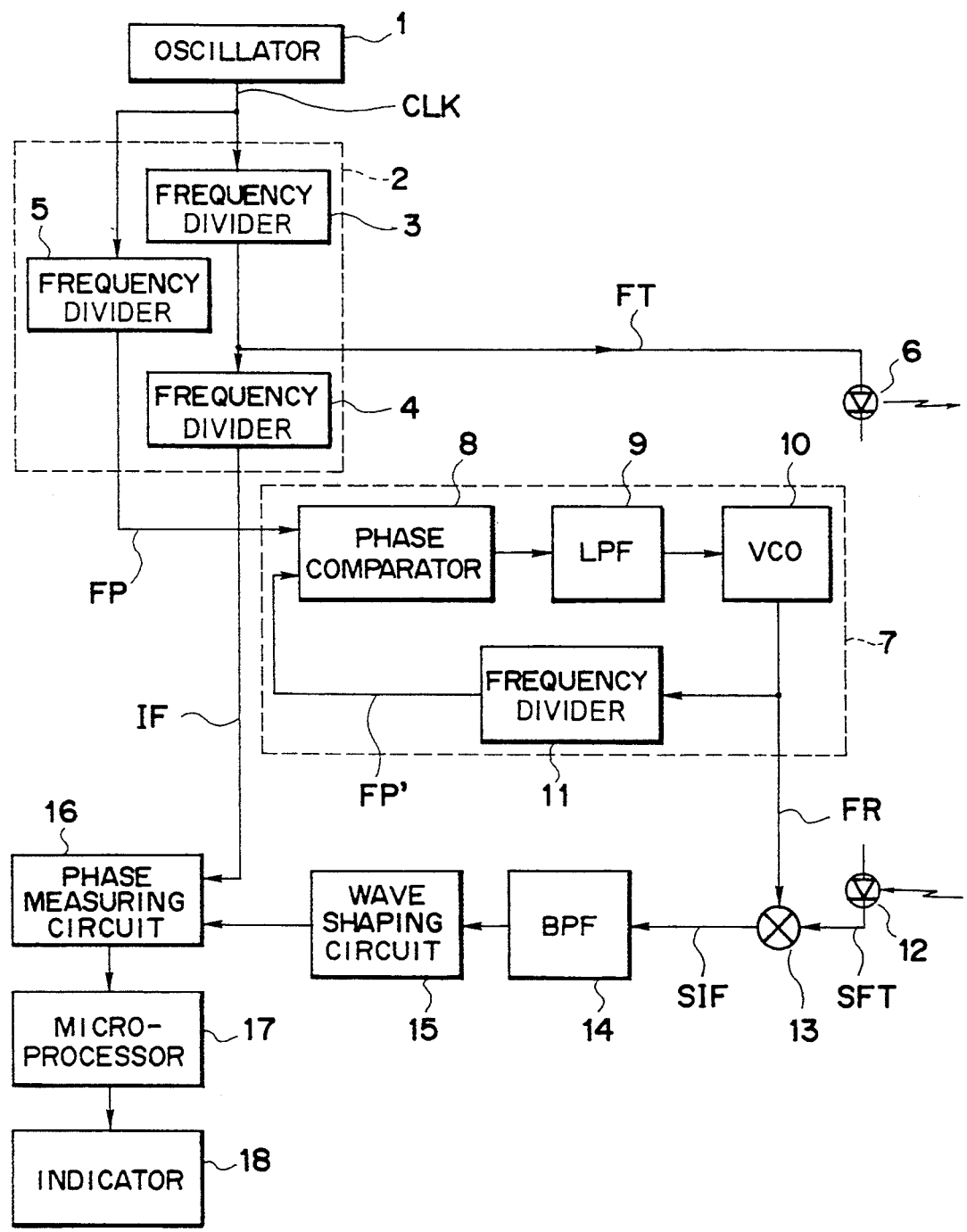
FIG. 1 is a block diagram illustrating a construction of an embodiment.

As illustrated in FIG. 1, an oscillator of this light wave distance measuring apparatus involves the use of a crystal oscillator 1. The oscillator 1 outputs clocks CLK of 45.0 MHz. A frequency dividing circuit 2 is connected to the oscillator 1. The frequency dividing circuit 2 consists of frequency dividers 3, 4, 5. The frequency divider 3 divides a frequency of the clock CLK by 3, thereby creating a first signal FT having a frequency of 15 [MHz]. The first signals FT are outputted to a light emitting element 6 and the frequency divider 4. The frequency divider 4 further divides a frequency of the first signal FT by $2^{12}$, thereby creating a second signal IF having a frequency as low as 3.66 [KHz]. The second signal IF is outputted as a reference signal to a phase measuring circuit 16. The frequency divider 5 divides a frequency of the clock CLK by $2^{12}$, thereby creating a third signal FP having a relatively low frequency on the order of 11.0 [KHz] (three times as high as a frequency of the base intermediate signal IF). The second signal FP is outputted to a phase comparator 8 in a PLL circuit 7.

The light emitting element 6 emits the light (hereinafter called distance measuring light) wherein the first signal FT from the frequency divider 3 is intensity-modulated as a modulation signal. The distance measuring light is emitted toward a reflection member 19. A part of this distance measuring light reflected by the reflection member 19 is incident on a light receiving element 12. The reflection member 19 known as a corner cube or the like is disposed in a want-to-measure position. The light receiving element 12 outputs a light receiving signal SFT into which the distance measuring light detected is photoelectrically converted. The light receiving signal SFT having a frequency substantially equal to that of the first signal is inputted to a mixer 13.

On the other hand, the PLL circuit 7 is constructed of the phase comparator 8, a low-pass filter (LPF) 9, a voltage control oscillator (VCO) 10 and a frequency divider 11. A third signal FP transmitted from the frequency divider 5 is inputted to one terminal of the phase comparator 8. Further, a feedback signal FP' is inputted to the other terminal of the phase comparator 8. The feedback signal FP' will be stated later. The phase comparator 8 compares a phase of this inputted signal FP with a phase of the feedback signal FP'. The phase comparator 8 outputs a phase difference signal indicating a phase difference in the form of a voltage value. A high-frequency component of this phase difference signal is removed by the LPF 9 and further smoothed. The smoothed phase difference signal is outputted to the VCO 10. The VCO 10 outputs a high reference signal FR having a predetermined relatively-high frequency in accordance with this phase difference signal. Note that a frequency of this high reference signal FR is as relatively high as 14.996 [MHz] obtained by subtracting the frequency of the third signal FP from that of the first signal FT. This high reference signal FR is outputted as an output signal of the PLL circuit 7 and simultaneously outputted to the frequency divider 11. The frequency divider 11 divides a frequency of the high reference signal FR such as $1/((2^{12}-1)/3)=1/1365$. The feedback signal FP' is thus created and outputted to the other input terminal of the phase comparator 8. The feedback signal FP' is a signal having a frequency substantially equal to that of the third signal FP.

This PLL circuit 7 is stabilized when the frequencies and phases of the third signal FP and the feedback signal FP' are synchronized. Relationships between the frequencies of the respective signals when stabilized can be expressed by the following equations:

fFT=CLK/3 fIF=fFT/$2^{12}$ fFP=3×fIF=CLK/$2^{12}$ fFR=fFT−fIF=CLK/(3×(1−1/$2^{12}$))

where fFT is the frequency of the first signal, fIF is the frequency of the second signal IF, fFP is the frequency of the third signal FP, and fFR is the frequency of the high reference signal FR.

Figure 2A:
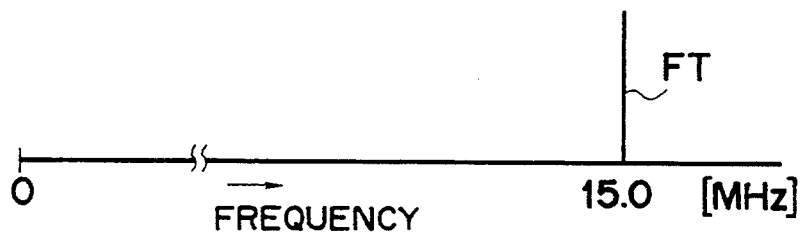
FIG. 2A is a diagram showing a frequency component of an output signal of a frequency divider in FIG. 1.
Figure 2B:
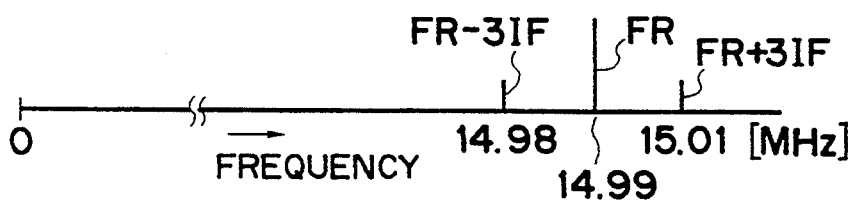
FIG. 2B is a diagram showing a frequency component of an output signal of a PLL circuit in FIG. 1.
Figure 2C:
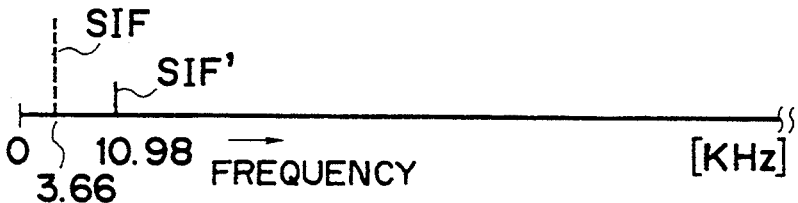
FIG. 2C is a diagram showing a frequency component of an output signal of a mixer 13 in FIG. 1.
Figure 3:
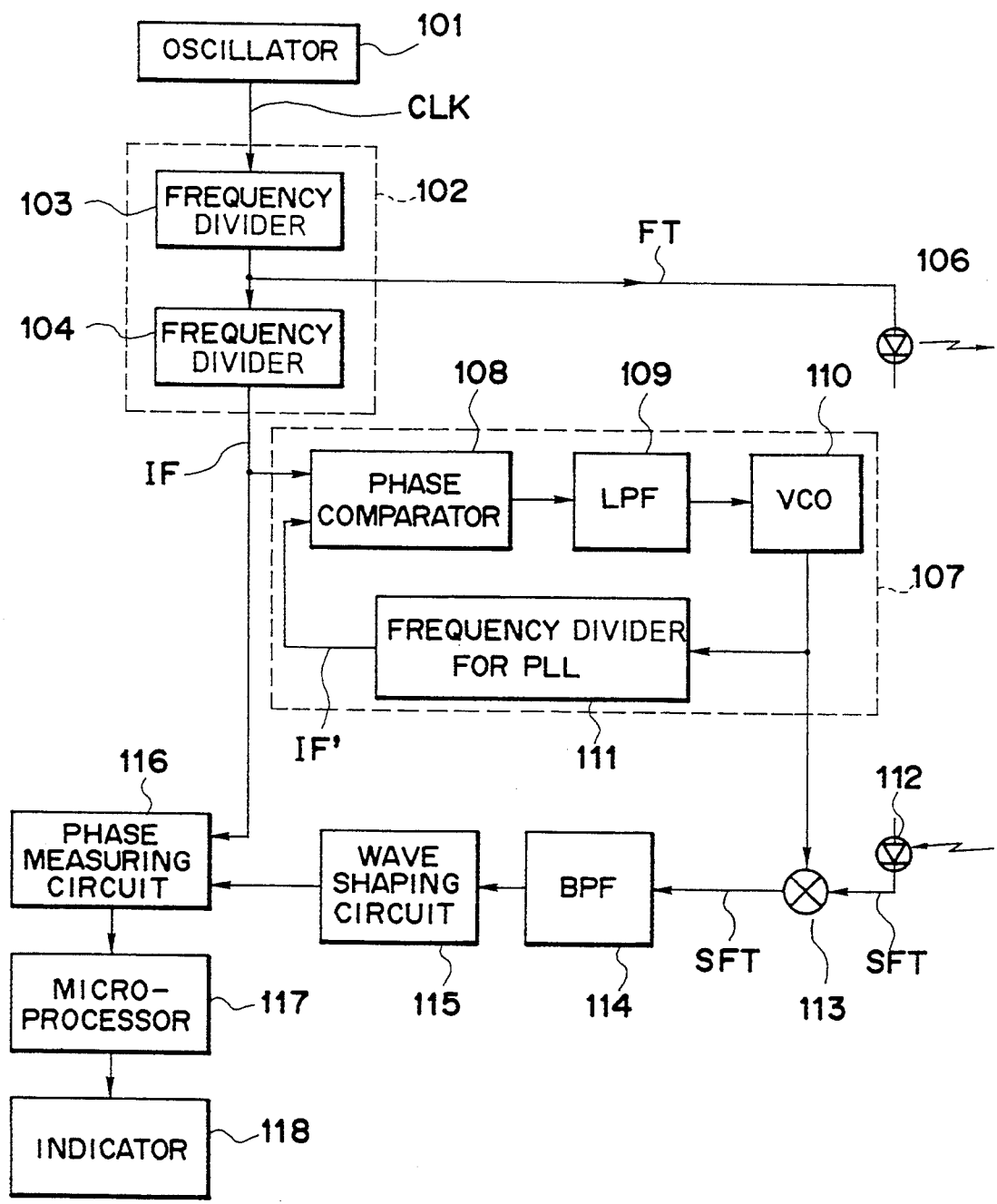
FIG. 3 is a diagram illustrating a construction of a conventional apparatus.

These signals have the frequencies shown in FIGS. 2A~2C. FIG. 2A illustrates an output signal of the frequency divider 3, i.e., the modulation signal FT. Note that the light receiving signal SFT from the light receiving element 12 also has a frequency substantially equal to that of this modulation signal FT. This light receiving signal SFT has a phase shift in comparison with the modulation signal FT. FIG. 2B illustrates an output signal of the PLL circuit 7. This output signal consists of the high reference signal FR that is to be originally outputted and spurious signals having frequencies FR−FP, FR+FP defined as spurious components of this high reference signal FR.

The mixer 13 takes in two signals, i.e., the output signal of this PLL circuit 7 and the light receiving signal SFT transmitted from the light receiving element 12. The mixer 13 thus creates an intermediate signal SIF having a low frequency. This intermediate signal SIF, which is obtained by mixing the frequencies of the two signals described above, ideally has a frequency of 3.66 KHz of FT−FR=IF. The intermediate signal SIF is a signal assuming such a state as to include a phase shift corresponding to distance information.

However, the output signal from the PLL circuit 7 contains the spurious signals. As a matter of fact, the mixer 13 therefore outputs an output signal SIF+SIF' shown in FIG. 2C. Namely, the output signal of the mixer 13 consists of the intermediate signal SIF having the frequency fIF including phase information and the low spurious signal SIF' having the frequency fFP that is based on the spurious signal.

A bandpass filter 14 passes, when these two signals SIF+SIF' are inputted, only the intermediate signal SIF including the phase information, thereby reducing the spurious signal SIF'. More specifically, the BPF 14 passes the intermediate signal SIF having a frequency of 3.66 [KHz] in a relatively low frequency band. The BPF 14 is capable of easily reducing the spurious signal having a 3-fold frequency, i.e., the frequency FP with respect to the signal having this frequency of 3.66 [KHz].

A phase measuring circuit 16 compares a phase of the intermediate signal SIF in which the low spurious signal is thus attenuated with a phase of the second signal IF. The phase measuring circuit 16 thereby outputs a phase difference signal. This phase difference signal indicates a phase difference corresponding to a distance to the reflection member that is possessed by the intermediate signal. A microprocessor 17 converts this phase difference signal into a distance to the reflection member in accordance with the frequency fIF of the second signal employed. The microprocessor 17 causes an indicator 118 to indicate the thus converted distance to the reflection member.

Given next is an explanation of the relations between the frequencies of the respective signals according to the present invention.

When a frequency dividing ratio of the frequency divider is 1/a, the relationship between the clock CLK of the oscillator 1 and the frequency fFT of the modulation signal for intensity-modulating the light emitting element 6 is expressed such as:

$$fFT = CLK/a \qquad \text{Formula 1}$$

(where a: integer defined by a $\geq 2$)

Further, when the frequency ratios of the frequency dividers 4, 5 are 1/b and 1/c, the relationship between the frequency fIF of the second signal and the clock CLK of the oscillator is expressed such as:
fIF = CLK/(a×b)
fFP = CLK/c
(where c: integer defined by c$\geq 2$) In the light wave distance measuring apparatus in the embodiment, the frequency dividing ratio of the frequency divider 5 is equalized to the frequency dividing ratio 1/b of the frequency divider 4. Hence, when substituting c=b, the result is:

$$fIF = CLK/(a \times b) \; fFP = CLK/b \qquad \text{Formula 2}$$

Note that the frequency dividing ratios of the two frequency dividers are set equal in accordance with this invention. Combinations other than this may be, however, adoptable if set so that the frequency FP is not less than twice as high as the frequency IF, and a frequency dividing ratio easy to create a feedback signal having the same frequency as this frequency FP is selectable in the frequency divider 11 of the PLL circuit.

On the other hand, if the frequency dividing ratio of the frequency divider of the PLL circuit is set to 1/p, a frequency fFP' of a feedback signal fp' is given by:
fFP' = fFR/p
Herein, the frequency fFP of the third signal FP is, when the PLL circuit 7 is stabilized, substantially equal to the frequency fFP' of the feedback signal FP'. Therefore, the relationship therebetween can be expressed such as fFP = f FP'. The above-mentioned formula turns out as follows:

$$fFP' = fFP = fFR/p \qquad \text{Formula 3}$$

The following is a relationship between three frequencies of the light receiving signal SFT having the high frequency fSFT which has undergone the photoelectric conversion through the light receiving element 12, the output signal FR of the PLL circuit and the intermediate signal SIF having the relatively low frequency fSIF in the mixer 13.
fSIF = |fFR − fSFT|
Note that the spurious components can be removed by the BPF and therefore ignored. Herein, the frequency fSFT is merely out of phase with respect to the frequency fFT of the first signal, and hence it can be assumed that fSFT = fFT. Further, similarly the frequency fSIF is only out of phase with respect to the frequency fIF of the second signal IF, and therefore it can be assumed that fSIF = fIF. At this time, the above-stated formula turns out as below:

$$fIF = |fFR − fFT| \qquad \text{Formula 4}$$

In the formula 4, fIF, fFR and fFT are obvious from the formulae 1~3. Hence, when substituting the formulae 1~3 into the formula 4, the result is:

$$\begin{aligned} CLK/(a \times b) &= |fFP \times p - CLK/a| \\ &= |CLK/a - p \times CLK/b| \\ 1/(a \times b) &= |1/a - p/b| \end{aligned}$$

When the absolute values are taken off, the result is:

$$1 + b = a \times p, \; or \; b - 1 = a \times p \qquad \text{Formula 5}$$

Therefore, a=3, b=$2^{12}$, and p=($2^{12}$−1)×3 are selected in the embodiment. In the light wave distance measuring apparatus of this invention, however, the frequency dividing ratios of the respective frequency dividers 3, 4, 5 and the frequency divider 11 of the PLL circuit 7 may be set to satisfy the formula 5.

Moreover, in accordance with the embodiment, the output signal of the frequency divider 3 serves as the modulation signal of the light emitting element 6. In addition, the output signal of the PLL circuit 7 serves as the input signal of the mixer 13. If the difference between the frequencies of these two signals is equal to the frequency of the input signal (the second signal) of the phase measuring circuit 16, however, those signals may be set reversely. That is, the output signal of the frequency divider 3 may be set as the input signal of the mixer 13, while the output signal of the PLL circuit 7 may be set as the modulation signal.

Besides, the BFP has involved the use of the analog signal oriented bandpass filter. However, a digital signal oriented bandpass filter may be also used. Other filters such as an LPF are usable on condition that this BPF passes the intermediate signal having the frequency IF and removes the spurious signal having the frequency FP.

It is apparent that, in this invention, a wide range of different working modes can be formed based on the invention without deviating from the spirit and scope of the invention. This invention is not restricted by its specific working modes except being limited by the appended claims.

What is claimed is:

1. A light wave distance measuring apparatus comprising:
    an oscillator for outputting a reference clock;
    frequency dividing means for creating first, second and third signals having frequencies different from each other by dividing said reference clock and outputting said first, second and third signals, said first signal having the high frequency, said second and third signals having the low frequencies;
    a light emitting means for outputting the distance measuring light modulated by said first signal toward an object to be measured;

a light receiving means for receiving the distance measuring light reflected by said measured object and outputting a light receiving signal;

a means for creating a reference signal synchronizing with a phase of said third signal and having a frequency deviating by the frequency of said second signal from the frequency of said first signal;

a frequency mixing means for creating an intermediate signal on the basis of said light receiving signal and said reference signal, said intermediate signal having a frequency substantially equal to the frequency of said second signal;

a phase measuring circuit for outputting a phase difference signal indicating a phase difference between said intermediate signal and said second signal; and a determining means for determining a distance from said phase difference signal to said measured object.

2. The light wave distance measuring apparatus according to claim 1, further comprising a means, connected between said frequency mixing means and said phase measuring circuit, for removing a spurious signal having a frequency substantially equal to the frequency of said third signal from said intermediate signal.

3. The light wave distance measuring apparatus according to claim 2, wherein said spurious removing means is a bandpass filter for passing a signal having a frequency substantially equal to the frequency of said second signal.

4. A light wave distance measuring apparatus comprising:

an oscillator for outputting a reference clock;

frequency dividing means for creating first, second and third signals having frequencies different from each other by dividing said reference clock and outputting said first, second and third signals, said first signal having the high frequency, said second and third signals having the low frequencies;

a means for creating a modulation signal synchronizing with a phase of said third signal and having a frequency deviating by the frequency of said second signal from the frequency of said first signal;

a light emitting means for outputting the distance measuring light modulated by said modulation signal toward an object to be measured;

a light receiving means for receiving the distance measuring light reflected by said measured object and outputting a light receiving signal;

a frequency mixing means for creating an intermediate signal on the basis of said light receiving signal and said first signal, said intermediate signal having a frequency substantially equal to the frequency of said second signal;

a phase measuring circuit for outputting a phase difference signal indicating a phase difference between said intermediate signal and said second signal; and a determining means for determining a distance from said phase difference signal to said measured object.

5. The light wave distance measuring apparatus according to claim 4, further comprising a means, connected between said frequency mixing means and said phase measuring circuit, for removing a spurious signal having a frequency substantially equal to the frequency of said third signal from said intermediate signal.

6. The light wave distance measuring apparatus according to claim 5, wherein said spurious removing means is a bandpass filter for passing a signal having a frequency substantially equal to the frequency of said second signal.

* * * * *